United States Patent
Yang et al.

(10) Patent No.: US 11,899,215 B1
(45) Date of Patent: Feb. 13, 2024

(54) HEAD MOUNTED DISPLAY, DISPLAY DEVICE AND IMAGE DISPLAY METHOD THEREOF

(71) Applicant: HTC Corporation, Taoyuan (TW)

(72) Inventors: Po-Sen Yang, Taoyuan (TW); Ling-Yi Ding, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/876,576

(22) Filed: Jul. 29, 2022

(51) Int. Cl.
*G02B 27/01* (2006.01)
*G02B 27/14* (2006.01)
*G02B 27/10* (2006.01)

(52) U.S. Cl.
CPC ..... *G02B 27/0172* (2013.01); *G02B 27/1066* (2013.01); *G02B 27/144* (2013.01); *G02B 2027/0147* (2013.01)

(58) Field of Classification Search
CPC ............ G02B 27/0172; G02B 27/1066; G02B 27/144; G02B 2027/0147
See application file for complete search history.

(56) References Cited

U.S. PATENT DOCUMENTS

| 9,710,887 B1 * | 7/2017 | Sahlsten | G09G 3/003 |
| 2020/0166752 A1 * | 5/2020 | Konttori | G02B 27/0172 |

FOREIGN PATENT DOCUMENTS

| CN | 104506846 B | * | 1/2017 | |
| CN | 107209390 A | * | 9/2017 | G02B 27/0172 |
| CN | 108572453 A | * | 9/2018 | G02B 27/0172 |
| CN | 112106132 A | * | 12/2020 | G02B 27/0068 |
| CN | 112578564 A | * | 3/2021 | |
| JP | 2009211049 A | * | 9/2009 | G02B 6/06 |
| JP | 2017522591 A | * | 8/2017 | |
| TW | 202104982 | | 2/2021 | |
| WO | WO-2019221105 A1 | * | 11/2019 | G02B 27/0068 |

OTHER PUBLICATIONS

"Office Action of Taiwan Counterpart Application", dated Mar. 6, 2023, p. 1-p. 6.

* cited by examiner

*Primary Examiner* — Ricardo Osorio
(74) *Attorney, Agent, or Firm* — JCIPRNET

(57) ABSTRACT

A head mounted display, a display device and an image display method thereof are provided. The display device includes a first display and a second display. The first display is configured to provide a first display image to a peripheral area of a target zone. The second display is configured to provide a second display image to a central area of the target zone. A resolution of the second display image is higher than a resolution of the first display image.

10 Claims, 3 Drawing Sheets

HEAD MOUNTED DISPLAY, DISPLAY DEVICE AND IMAGE DISPLAY METHOD THEREOF

BACKGROUND

Technical Field

The disclosure is related to a head mounted display, a display device and an image display method thereof, and in particular to a head mounted display, a display device and an image display method thereof for a composite light field display system.

Description of Related Art

With the advancement of electronic technology, a light field display has been proposed. Common light field displays are roughly divided into five categories: high speed spin, multi-projector, directional backlight, multi layer display, and lens array.

In the related art, especially in the lens array type light field display, the main problem is that the resolution is not effectively improved. Therefore, how to improve the resolution of the light field display, so as to improve the user's image experience is an important issue for those skilled in the art.

SUMMARY

The disclosure provides a head mounted display, a display device and an image display method thereof, which improves the display effect of images.

The display device of the disclosure includes a first display and a second display. The first display is configured to provide a first display image to a peripheral area of a target zone. The second display is configured to provide a second display image to a central area of the target zone. A resolution of the second display image is higher than a resolution of the first display image.

The head mounted display device of the disclosure includes a main body portion and a display device as described above. The display device is disposed in the main body portion.

The image display method of the disclosure includes: configuring the first display to provide a first display image to a peripheral area of a target zone; configuring the second display to provide a second display image to a central area of the target zone; making a resolution of the second display image higher than a resolution of the first display image.

Based on the above, the disclosure uses the second display to provide a second display image with relatively high resolution to the central area of the target zone where the attention of human's eye is relatively concentrated. In the peripheral area of the target zone, the first display image with relatively low resolution is provided through the first display. In this way, in the light field display system, the display device of the disclosure effectively improves the display quality of the image. The display performance of virtual image in the application of head mounted display is also improved effectively.

DESCRIPTION OF THE EMBODIMENTS

Figure 1:
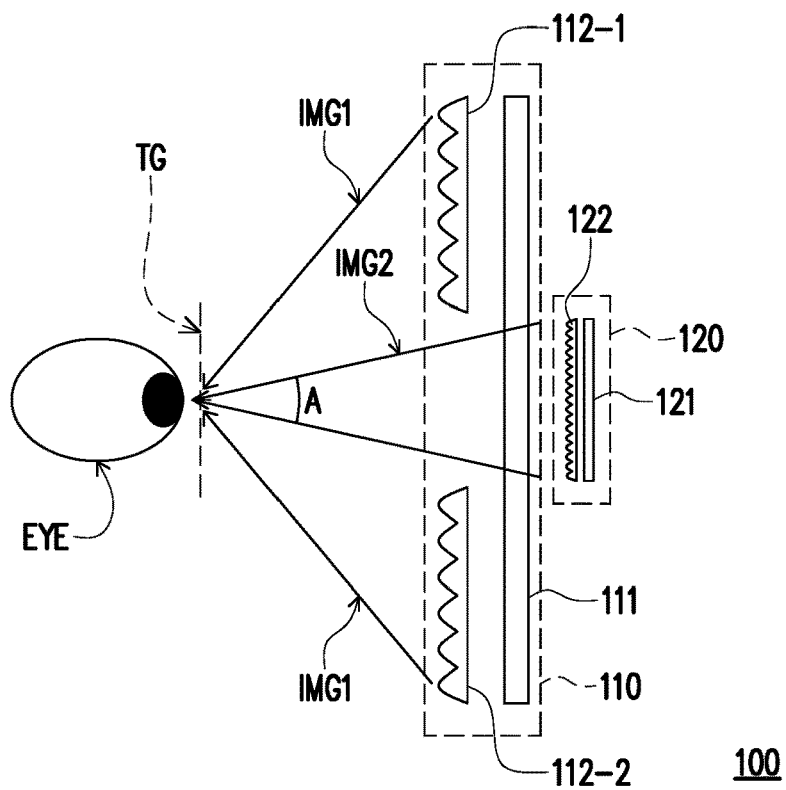
FIG. 1 is a schematic view of a display device according to an embodiment of the disclosure.

Please refer to FIG. 1. FIG. 1 is a schematic view of a display device according to an embodiment of the disclosure. The display device 100 includes a first display 110 and a second display 120. The first display 110 and the second display 120 overlap each other. The first display 110 is configured to project a first display image IMG1 toward a peripheral area of a target zone TG. The second display 120 is configured to provide a second display image IMG2 to a central area of the target zone TG. The target zone TG may be the area where the user's eyeball EYE is located. In this embodiment, the resolution of the second display image IMG2 projected by the second display 120 may be greater than the resolution of the first display image IMG1 projected by the first display 110.

The disposition of the first display 110 and the second display 120 is described in detail below. The first display 110 includes a display panel 111, a lens array 112-1, and a lens array 112-2. The lens array 112-1 and the lens array 112-2 overlaps the upper half area and the lower half area of the display panel 111, respectively. The central area of the display panel 111 does not overlap the lens arrays 112-1 and 112-2. The second display 120 is disposed corresponding to the central area of the display panel 111, and the display panel 111 is disposed between the target zone and the second display 120. That is, the second display 120 may be disposed behind the display panel 111.

In this embodiment, the second display 120 includes a display panel 121 and a lens array 122. The display panel 121 and the lens array 122 overlaps each other. The lens array 122 is disposed in front of the display panel 121.

The second display image IMG2 projected by the display panel 121 of the second display 120 penetrates the display panel 111 of the first display 110 to the central area of the target zone TG. In this embodiment, the first display 110 may be a transmissive display, that is, the display panel 111 of the first display 110 is a transmissive display panel. The transmittance of the first display 110 may be 80%. The first display 110 is configured to project the first display image IMG1 to the peripheral area of the target zone TG. It should be noted that in the target zone TG, a viewing angle A of a user to the second display image IMG2 may be between 20 and 60 degrees.

It should be noted that the second display 120 may be a micro-display, which provides the second display image IMG2 of the light field display image to the central area of a user's eyeball EYE. In this embodiment, the second display 120 provides the second display image IMG2 with relatively high resolution to the central area of the user's eyeball EYE, which enhances the display quality of the display device 100.

Figure 2:
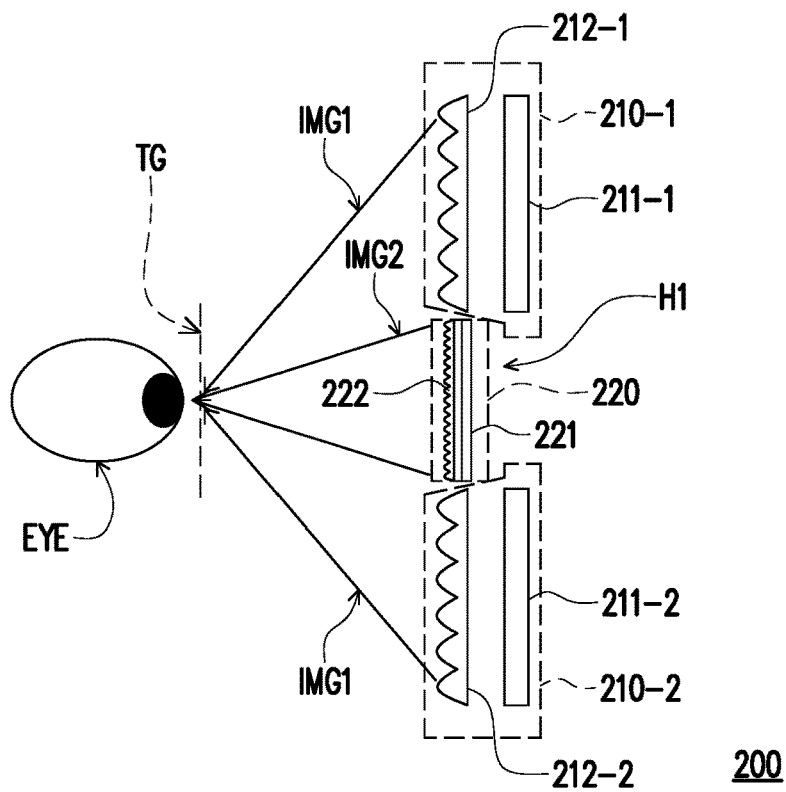
FIG. 2 is a schematic view of a display device according to another embodiment of the disclosure.

Please refer to FIG. 2. FIG. 2 is a schematic view of a display device according to another embodiment of the disclosure. The display device 200 includes a first display 210 and a second display 220. The central area of the first display 210 may have an opening area H1, and the second display 220 may be disposed in the opening area H1. The first display 210 includes a display panel 211-1, a display panel 211-2, a lens array 212-1, and a lens array 212-2. The display panels 211-1 and 211-2 and the lens arrays 212-1 and 212-2 overlaps each other respectively. The second display 220 includes a display panel 221 and a lens array 222. The display panel 221 and the lens array 222 overlaps each other.

In this embodiment, in the first display 210, the lens array 212-1 and the lens array 212-2 are respectively disposed in front of the display panel 211-1 and the display panel 211-2. The display panel 211-1 and the display panel 211-2 provide the first display image IMG1 to the peripheral area of the target zone TG. The target zone TG corresponds to the position of the user's eyeball. In the second display 220, the lens array 222 are disposed in front of the display panel 221. The display panel 221 provides the second display image IMG2 to the central area of the target zone TG.

By disposing the second display 220 in the opening area H1 in the central area of the first display 210, the second display 220 effectively provide the second display image IMG2 for the central area of the target zone TG. And by making the resolution of the second display image IMG2 higher than that of the first display image IMG1, the user may directly see the second display image IMG2 with high resolution, which effectively enhance the visual effect of the user.

Incidentally, in this embodiment, the shape of the opening area H1 may be disposed according to the shape of the second display 220. The shape of the opening area H1 may be, for example, a circle, an ellipse, a rectangle, a rhombus, an arbitrary regular polygon, etc., and are not limited thereto.

Figure 3A:
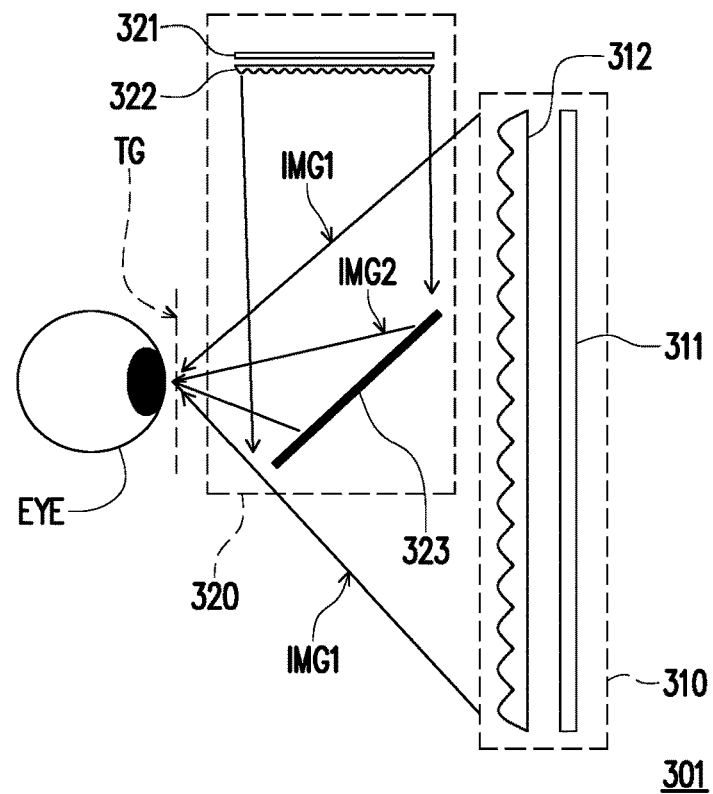
FIG. 3A and FIG. 3B are schematic views of different implementation manners of a display device according to another embodiment of the disclosure.
Figure 3B:
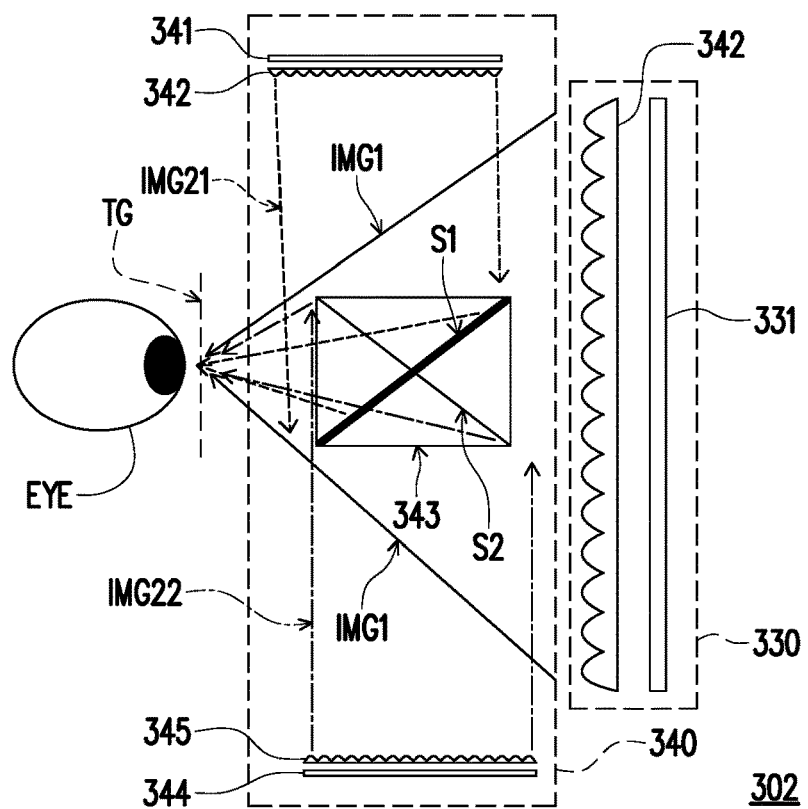

Please refer to FIG. 3A and FIG. 3B. FIG. 3A and FIG. 3B are schematic views of different implementation manners of a display device according to another embodiment of the disclosure. In FIG. 3A, the display device 301 includes a first display 310 and a second display 320. The second display 320 is disposed between the target zone TG and the first display 310. The first display 310 faces the target zone TG, where target zone TG corresponds to the position of the user's eyeball EYE.

In detail, the second display 320 includes a display panel 311 and a lens array 312. The lens array 312 is disposed in front of the display panel 311 and overlaps with the display panel 311. The display panel 311 is configured to project the first display image IMG1. The second display 320 includes a display panel 321, a lens array 322, and a semi-transparent reflector 323. The semi-transparent reflector 323 may be disposed at the position corresponding to a position of the central area of the display panel 311. The display panel 321 and the lens array 322 overlap each other and are disposed outside the image projection area of the display panel 311. The display panel 321 is configured to project the second display image IMG2 to the semi-transparent reflector 323. In addition, the semi-transparent reflector 323 reflects the second display image IMG2, and the second display image IMG2 is reflected to the central area of the target zone.

In addition, the first display image IMG1 projected by the display panel 311 penetrates the semi-transparent reflector 323 and is transmitted to the peripheral area of the target zone TG.

Similar to the aforementioned embodiment, the second display 320 of this embodiment effectively enhance the user's experience of the display image of the display device 301 by projecting the second display image IMG2 with relatively high resolution to the central area of the target zone TG.

Incidentally, in this embodiment, image projection directions of the first display 310 and the second display 320 do not have to be perpendicular to each other. As long as the image projection directions of the first display 310 and the second display 320 are not parallel to each other, they may have any included angle without any specific limitation.

In FIG. 3B, the display device 302 includes a first display 330 and a second display 340. The second display 340 is disposed between the target zone TG and the first display 330. The first display 330 faces the target zone TG, where target zone TG corresponds to the position of the user's eyeball EYE. The first display 330 includes a display panel 331 and a lens array 342 overlapping each other. The display panel 331 is configured to project the first display image IMG1, and the first display image IMG1 penetrates a beam splitter 343 to project to the peripheral area of the target zone TG.

Different from the embodiment in FIG. 3A, in this embodiment, the second display 340 includes a display panel 341, a display panel 344, a lens array 342, a lens array 345, and the beam splitter 343. The beam splitter 343 may be disposed in front of the first display 330 corresponding to a position of the central area of the display panel 331. The display panel 341 and the lens array 342 overlap each other and are disposed outside a first side of the beam splitter 343. The display panel 344 and the lens array 345 overlap each other and are disposed outside a second side of the beam splitter 343. The first side is opposite to the second side.

The beam splitter 343 has two reflecting surfaces S1 and S2. The display panel 341 is configured to project a first sub display image IMG21 to the reflecting surface S1 of the beam splitter 343. The reflecting surface S1 of the beam splitter 343 is configured to reflect the first sub display image IMG21 to the central area of the target zone TG. The display panel 344 is configured to project a second sub display image IMG22 to the reflecting surface S1 of the beam splitter 343. The reflecting surface S1 of the beam splitter 343 is configured to reflect the second sub display image IMG22 to the central area of the target zone TG. The first sub display image IMG21 and the second sub display image IMG22 may be combined into the second display image with relatively high resolution.

It should be noted that a first distance between geometric centers of the display panel 341 and the beam splitter 343 may be the same as or different from a second distance between geometric centers of the display panel 344 and the beam splitter 343, and are not limited thereto.

It is worth mentioning that in this embodiment, by making the first distance and the second distance the same, a display image with high resolution may be obtained by overlapping the first sub display image IMG21 and the second sub display image IMG22. By making the first distance and the second distance different, the first sub display image IMG21 and the second sub display image IMG22 become two images with parallax, which generate a stereoscopic image.

Figure 4:
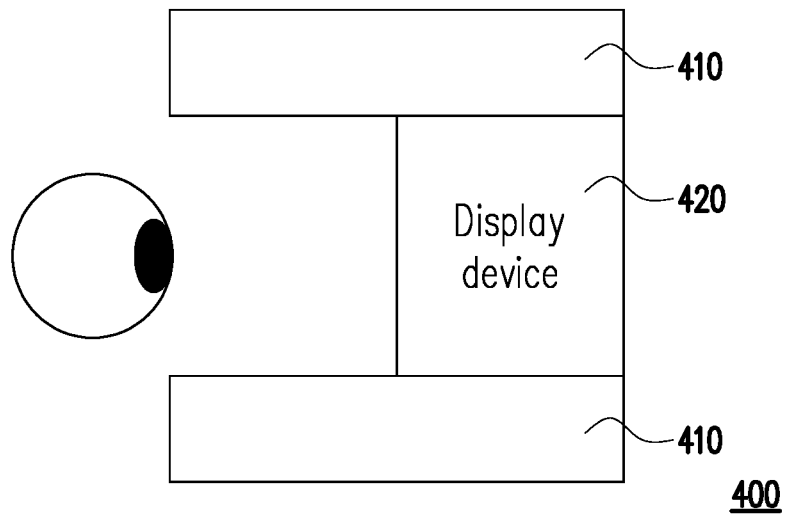
FIG. 4 is a schematic view of ahead mounted display of an embodiment of the disclosure.

Please refer to FIG. 4. FIG. 4 is a schematic view of a head mounted display of an embodiment of the disclosure. The head mounted display device 400 includes a main body portion 410 and a display device 420. The display device 420 may be disposed in the main body portion 410. The display device 420 may be implemented by using any one of the display devices 100, 200, 301, and 302 of the aforementioned embodiment, and is configured to provide image display effect of virtual reality.

Figure 5:
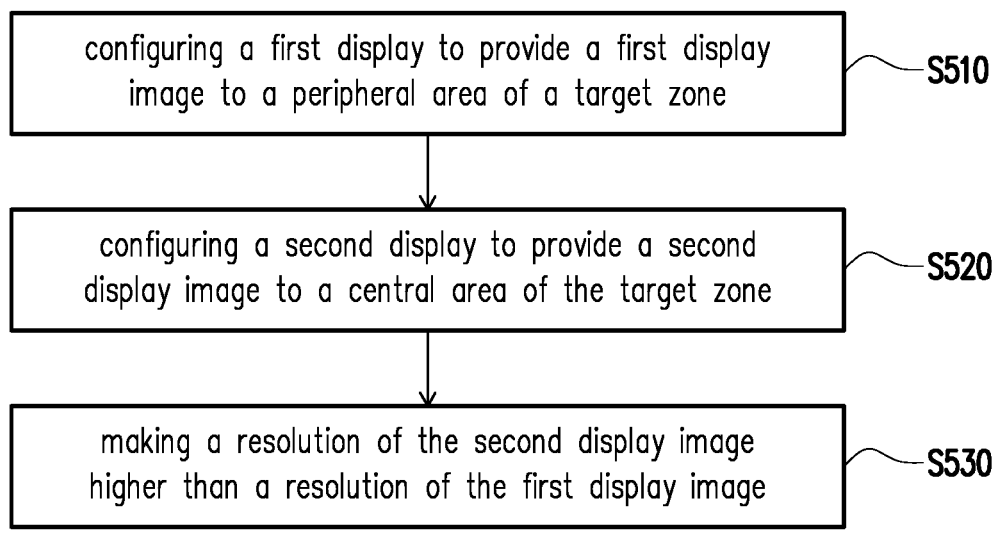
FIG. 5 is a flowchart of an image display method of an embodiment of the disclosure.

Please refer to FIG. 5. FIG. 5 is a flowchart of an image display method of an embodiment of the disclosure. In step S510, the first display is configured to provide a first display image to a peripheral area of a target zone. In step S520, the second display is configured to provide a second display image to a central area of the target zone. In addition, in step S530, a resolution of the second display image is made to be higher than a resolution of the first display image.

The implementation details of the above steps have been described in detail in the aforementioned embodiments, and will not be repeated here.

To sum up, the display device of the disclosure provides a second display to project the second display image with relatively high resolution to the central area of the target zone. By displaying the second display image within a certain viewing angle range of the user, the quality of the display image generated by the display device is effectively improved. The user's experience of the display image is also enhanced.

What is claimed is:

1. A display device, comprising:
    a first display, configured to provide a first display image to a peripheral area of a target zone; and
    a second display, configured to provide a second display image to a central area of the target zone, wherein the second display comprises:
    a beam splitter, having a first reflecting surface and a second reflecting surface;
    a first display panel, configured to project a first sub display image to the first reflecting surface;
    and a second display panel, configured to project a second sub display image to the second reflecting surface, wherein the beam splitter reflects the first sub display image and the second sub display image to the central area of the target zone to form the second display image, and wherein a resolution of the second display image is higher than a resolution of the first display image, wherein the first display image penetrates the beam splitter to project to the peripheral area of the target zone.

2. The display device according to claim 1, wherein the first display and the second display overlap each other.

3. The display device according to claim 2, wherein the first display is a transmissive display.

4. The display device according to claim 3, wherein a transmittance of the first display is 80%.

5. The display device according to claim 1, wherein the first display comprises:
    a display panel; and
    a lens array, overlapping the display panel, wherein the lens array is disposed between the display panel and the target zone.

6. The display device according to claim 1, wherein a viewing angle of a user to the second display image in the target zone is between 20 and 60 degrees.

7. A head mounted display, comprising:
    a main body portion; and
    the display device according to claim 1, disposed in the main body portion.

8. An image display method, comprising configuring a first display to provide a first display image to a peripheral area of a target zone; configuring a second display to provide a second display image to a central area of the target zone, comprising:
    disposing a beam splitter, wherein the beam splitter has a first reflecting surface and a second reflecting surface;
    disposing a first display panel, wherein the first display panel is configured to project a first sub display image to the first reflecting surface; and
    disposing a second display panel, wherein the second display is configured to project a second sub display image to the second reflecting surface, wherein the beam splitter reflects the first sub display image and the second sub display image to the central area of the target zone to form the second display image; and
    making a resolution of the second display image higher than a resolution of the first display image, wherein the first display image penetrates the beam splitter to project to the peripheral area of the target zone.

9. The image display method according to claim 8, further comprising:
    making a viewing angle of a user to the second display image in the target zone between 20 and 60 degrees.

10. The image display method according to claim 8, further comprising:
    overlapping the first display and the second display, wherein the first display is a transmissive display.

* * * * *